July 15, 1924.
W. N. BOOTH
1,501,581
DEMOUNTABLE RIM SECURING DEVICE FOR VEHICLE WHEELS
Filed June 20, 1918
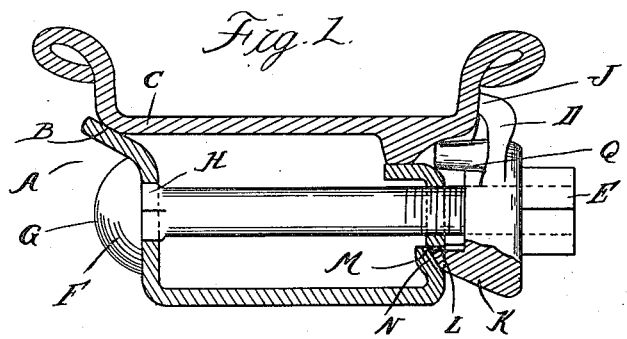
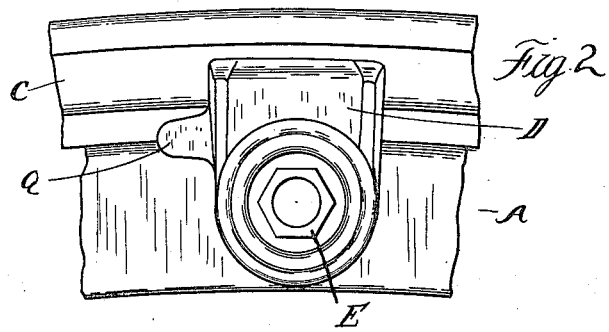
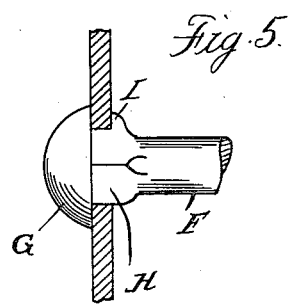
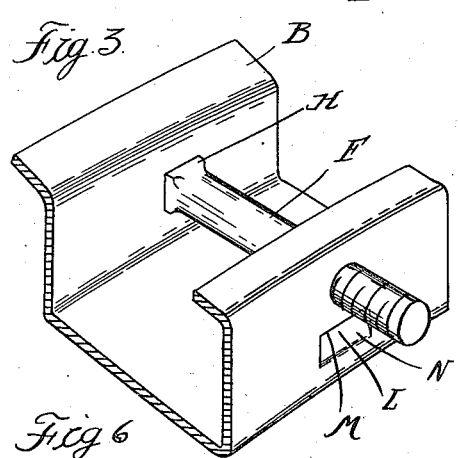
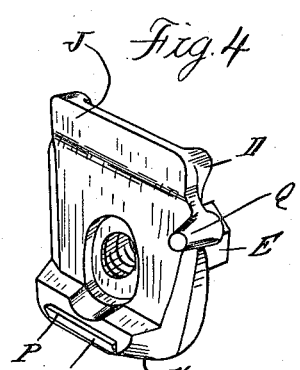
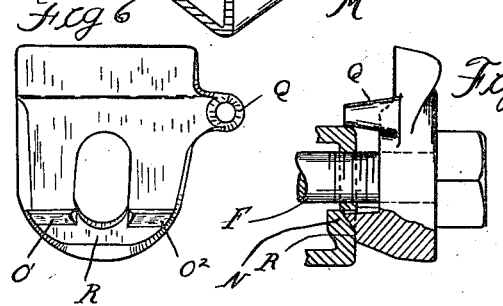
Inventor
William N. Booth
By Whittemore Hulbert & Whittemore
Attorneys Patented July 15, 1924.

1,501,581

UNITED STATES PATENT OFFICE.

WILLIAM N. BOOTH, OF DETROIT, MICHIGAN.

DEMOUNTABLE-RIM-SECURING DEVICE FOR VEHICLE WHEELS.

Application filed June 20, 1918. Serial No. 240,931.

*To all whom it may concern:*

Be it known that I, WILLIAM N. BOOTH, a citizen of the United States of America, residing at Detroit, in the county of Wayne and State of Michigan, have invented certain new and useful Improvements in Demountable-Rim-Securing Devices for Vehicle Wheels, of which the following is a specification, reference being had therein to the accompanying drawings.

The invention relates to vehicle wheels of the demountable rim type and more particularly to wheels provided with metallic fellies. The invention consists in the novel means for positioning and clamping the demountable rim upon the felly as hereinafter set forth.

In the drawings:

Figure 1 is a cross-section through the felly of the vehicle wheel provided with my improved demountable rim-securing means;

Figure 2 is a front elevation thereof;

Figure 3 is a perspective view of a portion of the felly with the rim detached;

Figure 4 is a similar view showing the clamping lug;

Figure 5 is a section showing the manner of securing the bolt to the rim; and

Figures 6 and 7 are respectively a rear elevation and sectional side elevation of one of the clamping lugs slightly modified in construction.

A is a metallic felly for vehicle wheels, which is of a channel shape cross-section having formed on one of its flanges the outwardly-inclined seat portion B for engaging a demountable rim C. D is a clamping lug for engaging the opposite side of the rim, being provided with a swivelled nut E, and F is a bolt or stud passing transversely through the channeled rim and threaded to engage the nut E.

It is essential that the bolt or stud F should be held from rotation during screwing on or off of the nut E and it is also desirable to hold the bolt from detachment from the rim. I have therefore formed the bolt with a head G and adjacent thereto a non-circular and preferably a square shank H which engages a correspondingly-shaped aperture in the side flange of the felly. After the bolt is placed in engagement with the felly it is locked from accidental displacement, preferably by riveting or upsetting a fin at one angle of the portion H, as indicated at I. This while holding the bolt from accidental displacement will nevertheless permit of its being driven out when necessary for repair or replacement.

The clamping lug D which secures the demountable rim in place is provided with a portion J for freely bearing upon the rim and a heel portion K for bearing upon the side of the felly. It is difficult to construct the parts with such accuracy that these bearing portions are in a plane exactly perpendicular to the axis of the bolt, and where the bearing is inclined there is a tendency for the lug to be deflected in the direction of the inclination. Furthermore in forming the felly it is difficult to avoid an inward inclination in the portion forming a bearing for the heel K. I have overcome this defect by stamping into the side of the felly a recess for engaging the heel of the lug and forming a bearing having an opposite incline or one tending to force the lug outward. Outward movement is, however, limited by a shoulder and this being accurately positioned will hold the lug with like accuracy. As shown this recess L is formed by shearing and striking inward the metal of the side flange of the felly, thereby forming a shoulder M at the sheared edge. The depth of the recess is somewhat less than the gauge or thickness of the metal so that there is no opening through the flange, but by reason of the shearing a square shoulder is formed and also an inclined bearing surface N. The lug D is provided with a corresponding inclined bearing portion O having a shoulder P for engaging with the shoulder M. Thus when the nut E is engaged with the bolt and screwed up to effect the clamping the lug D will be automatically positioned with the shoulder P bearing against the shoulder M. This will hold the rim C concentric with the axis of the wheel. Also with this arrangement the lug D is free to fulcrum about the bearing surface N of the felly during the movement of the lug toward the felly and particularly the final portion of this movement to effect the clamping of the rim upon the felly.

In turning the nut E there is a tendency for the lug D to revolve with the nut, thereby displacing it from proper position. To prevent this result I place upon one side of the lug an inwardly-projecting member Q which will extend between the outer edge of the felly and the demountable rim.

Sufficient clearance is provided to avoid any clamping action by the member Q, but engagement is such as to hold the lug from rotating with the nut.

As shown in Figures 6 and 7, the inclined bearing instead of being arranged centrally of the lug, is arranged on opposite sides of the aperture in the lug, as indicated at O' and O². This will permit of forming the shoulder N on opposite sides of the bolt F and will give greater clearance. The lug D is also provided with a flat bearing face R on its heel portion which takes the clamping thrust. This will relieve the portions O' and O² from wear and will add to the life of the lug.

What I claim as my invention is:

1. The combination with a demountable rim, of a felly forming a seat for said rim and provided with a metallic plate on the side opposite to said seat, said plate having a portion sheared and struck inward to a depth less than the thickness of the plate forming a recess with an inclining face and a shoulder, and means for securing said rim to its seat, comprising a clamping lug provided with a heel for engaging said recess and bearing upon said inclined face, said shoulder forming a stop for limiting and exactly positioning said clamping lug.

2. The combination with a demountable rim, a felly having a seat for said rim and means for securing said rim to its seat, comprising a clamping lug for securing said rim to its seat, of a projection on said lug for engaging the groove between the felly and rim and holding said lug from rotation.

3. The combination with a demountable rim, a felly having a seat for said rim and means for securing said rim to its seat, comprising a clamping lug for securing said rim to its seat, of a pin projecting inwardly from one side of said lug and engageable with a groove between said felly and rim to prevent the rotation of said lug during clamping of the same.

4. The combination with a demountable rim, of a metallic felly, means for securing said rim to said felly comprising a clamping lug and means for moving said clamping lug toward said felly to secure said rim upon said felly, and a struck-out fulcrum bearing on said felly freely engaging the inner end of said clamping lug and permitting of the fulcruming of said clamping lug during the final portion of the movement of said clamping lug toward said felly.

5. The combination with a demountable rim, of a metallic felly of U-shaped cross section having a seat on one of the flanges thereof for engagement by said demountable rim, and means for securing said demountable rim to said felly comprising a clamping lug on the opposite side of said felly, a bolt passing through the flanges of said felly and said clamping lug, and means associated with said bolt for forcing said clamping lug toward said felly, and a struck-out portion of said felly engageable with the inner end of said clamping lug and forming a fulcrum bearing therefor, said struck-out portion of said felly being arranged to permit of the fulcruming of said clamping lug during the final portion of the movement of said clamping lug toward said felly.

6. The combination with a demountable rim, of a metallic felly of U-shaped cross section having a seat on one of the flanges thereof for engagement by said demountable rim, and means for securing said demountable rim to said felly comprising a clamping lug on the opposite side of said felly, a bolt passing through the flanges of said felly and said clamping lug, and means associated with said bolt for forcing said clamping lug toward said felly, and a bearing on said felly engageable with the inner end of said clamping lug to hold the same from inward radial movement, said bearing being arranged to permit of the fulcruming of said clamping lug during the final portion of the movement thereof toward said felly.

7. The combination with a demountable rim, of a metallic felly of U-shaped cross section having a seat on one of the flanges thereof for engagement by said demountable rim, and means for securing said demountable rim to said felly comprising a clamping lug on the opposite side of said felly having a portion freely engaging a side of said demountable rim and an inwardly extending fulcrum, a bolt passing through the flanges of said felly and through said clamping lug intermediate its inwardly extending fulcrum and its demountable rim engaging portion and means upon said bolt for moving said clamping lug toward said felly, and a fulcrum bearing on said felly forming an end abutment for freely engaging said inwardly extending fulcrum and permitting of the swinging of said clamping lug thereabout during the final portion of the movement of said clamping lug toward said felly, said fulcrum bearing holding said clamping lug from radial inward movement.

8. The combination with a demountable rim, of a metallic felly, means for securing said rim to said felly comprising a clamping lug, means for moving said clamping lug toward said felly to secure said rim upon said felly, and a struck-out bearing on said felly forming an end abutment for engaging the inner end of said clamping lug and holding said clamping lug from radial inward movement, said struck-out bearing being arranged to permit of the fulcruming of said clamping lug during the final portion of the movement thereof toward said felly.

9. The combination with a demountable rim, of a metallic felly of U-shaped cross section having a seat on one of the flanges thereof for engagement by said demountable rim and having a recessed portion stamped into the other of the flanges thereof, means for securing said rim to its seat comprising a clamping lug on the side of said felly opposite to said seat having its outer end engageable with said demountable rim and its inner end engaging said recessed portion, and means engageable with said clamping lug intermediate its ends for moving the same toward said felly, said recessed portion forming a fulcrum bearing for said clamping lug and being arranged to permit the fulcruming of said clamping lug during the final portion of the movement thereof toward said felly.

10. The combination with a demountable rim, of a metallic felly of U-shaped cross section having a seat on one of the flanges thereof for engagement by said demountable rim, and an inwardly-struck portion upon the other of the flanges thereof forming a recess with an outwardly inclined face, and means for securing said demountable rim to said felly comprising a clamping lug on the side of said felly opposite to said seat having an outer end engageable with said demountable rim and an inner end engageable with said inwardly struck portion, a bolt passing through the flanges of said felly and also through said clamping lug intermediate its ends, and means associated with said bolt for forcing said clamping lug toward said felly, said inwardly-struck portion forming an end abutment for said clamping lug and being arranged to permit of the fulcruming of said clamping lug during the final portion of the movement thereof toward said felly.

11. The combination with a demountable rim, of a flanged metallic felly providing a seat for engagement by said demountable rim, means for securing said demountable rim to its seat comprising a clamping lug, a bolt for engaging said clamping lug passing transversely through said felly, said bolt having a polygonal portion extending inwardly through a flange of said felly and beyond its inner side, a head on the end of said bolt and at the outer side of said flange, and a fin formed on the polygonal portion of said bolt engageable with the inner side of said flange to retain said bolt from longitudinal disengagement.

In testimony whereof I affix my signature.

WILLIAM N. BOOTH.